(No Model.)
L. STEINBERGER.
SELF LUBRICATING HUB.
No. 350,951. Patented Oct. 19, 1886.
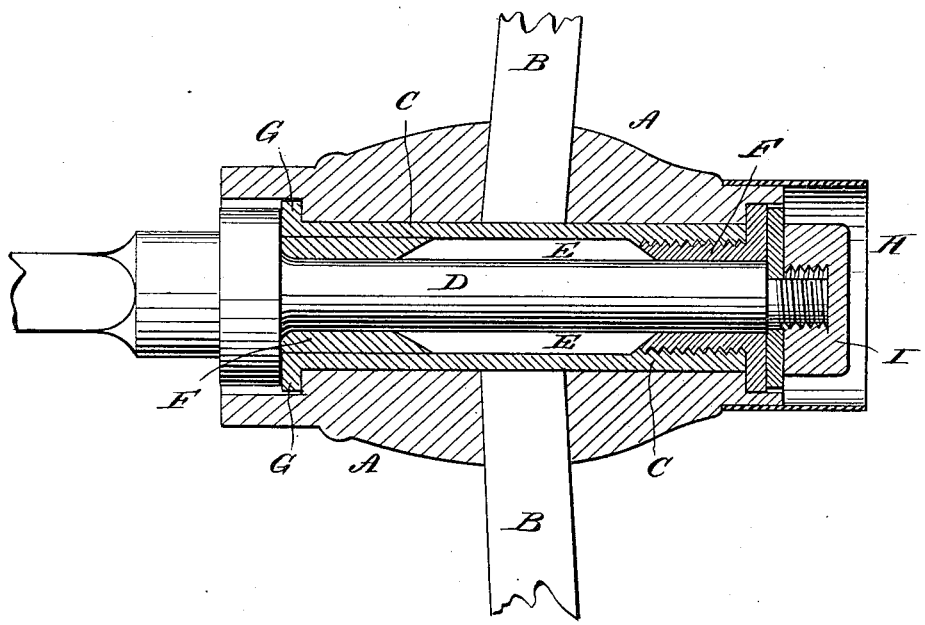
WITNESSES:
INVENTOR:
L. Steinberger
BY Munn & Co.
ATTORNEYS.

UNITED STATES PATENT OFFICE.

LOUIS STEINBERGER, OF NEW YORK, N. Y., ASSIGNOR OF ONE-THIRD TO JOSEPH O'CONNOR, OF SAME PLACE.

SELF-LUBRICATING HUB.

SPECIFICATION forming part of Letters Patent No. 350,951, dated October 19, 1886.

Application filed June 5, 1885. Renewed March 22, 1886. Serial No. 196,193. (No model.)

*To all whom it may concern:*

Be it known that I, LOUIS STEINBERGER, of the city, county, and State of New York, have invented certain new and useful Improvements in Anti-Friction and Self-Lubricating Axle-Boxes for Wheels, of which the following is a full, clear, and exact description.

Reference is to be had to the accompanying drawing, forming part of this specification, in which a central longitudinal section of my invention is shown.

A represents a hub, in which are fitted the spokes B, in the ordinary or any approved manner. Within the hub A is fitted a detachable bushing, C, of a diameter somewhat larger than the axle D. In each end of the hub are inserted the bearings F for the axle, the outer end having a flange or collar, and being provided with an external screw-thread to engage with an internal screw-thread on the outer end of the bushing C, as shown, and which, when screwed to place, draws the flange G of the bushing C snugly against a shoulder formed for it on the hub. It will be observed that the bearings F thus form a central recess, E, to retain the lubricating material. One of these bearings F may be cast or otherwise formed in one with the bushing C, or separate therefrom, as shown.

H and I are the usual nut and cap.

Having thus described my invention, I claim as new and desire to secure by Letters Patent—

The combination of the detachable bushing C, having a flange, G, at one end to bear against a shoulder on the inner end of the hub, and a screw-thread on the inner surface of its opposite end, a detachable bearing, F, having a screw-thread thereon to engage with the screw-thread on the bushing C, and a flange to bear against a shoulder on the outer end of the hub, substantially as shown and described, whereby the two flanges are drawn snugly against the shoulders on the hub, as set forth.

LOUIS STEINBERGER.

Witnesses:
 EDGAR TATE,
 EDWD. M. CLARK.